United States Patent Office 2,725,844
Patented Dec. 6, 1955

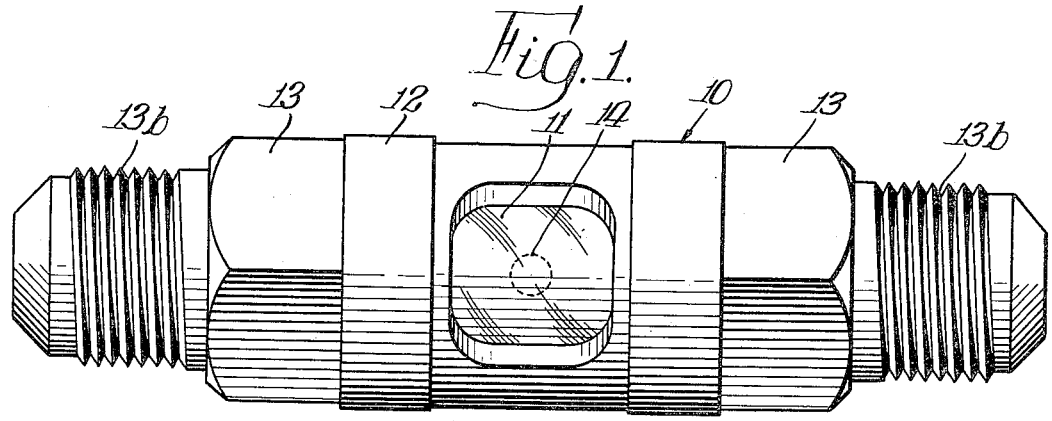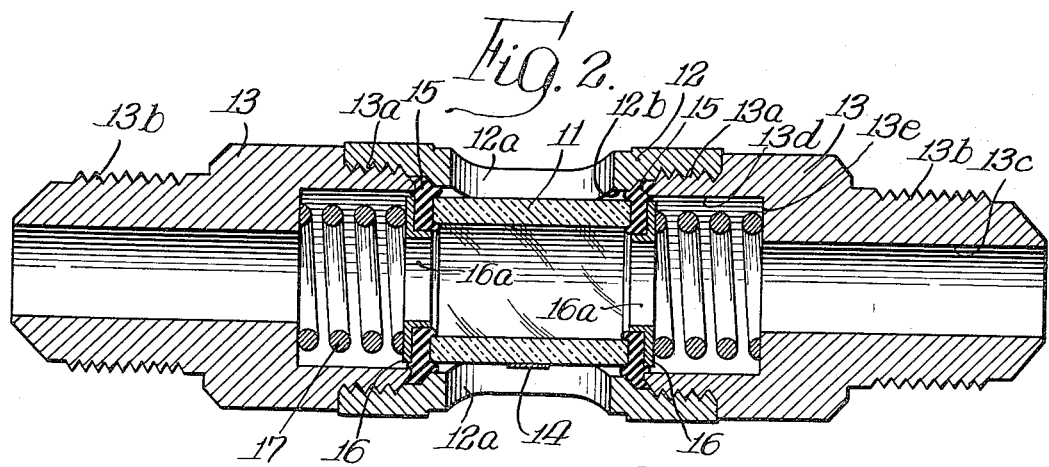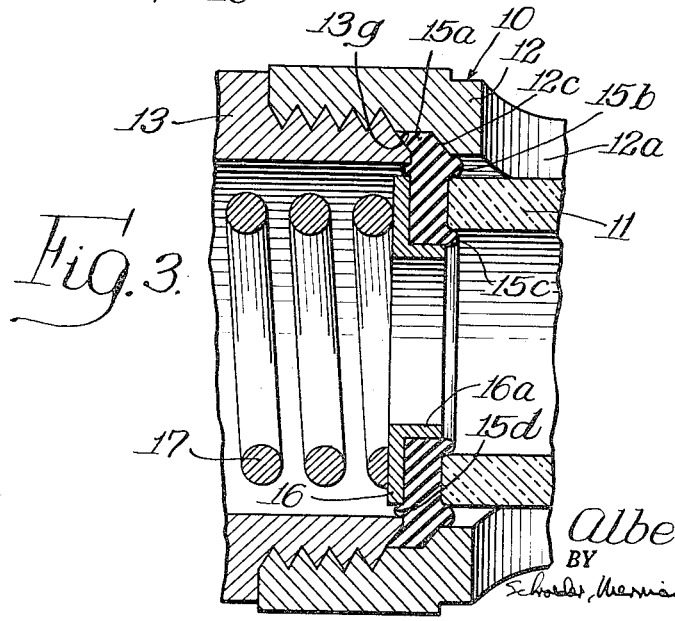

2,725,844

FLOW INDICATOR

Albert Wittlin, Chicago, Ill.

Application August 16, 1952, Serial No. 304,751

5 Claims. (Cl. 116—117)

This invention relates to a flow indicator adapted to be inserted in a fluid line so that flow of fluid through the line and through the indicator may be easily observed.

This application is a continuation-in-part of my co-pending application Serial No. 45,533, filed August 21, 1948.

Flow indicators of the type disclosed and claimed herein are particularly useful in refrigerant lines in refrigerator systems for observing the flow of the fluid, its condition and its nature.

Prior flow indicators of this general nature have been somewhat bulky particularly in their lateral dimensions and have not always been effective in providing a tight seal between the parts of the indicator and particularly between the transparent tube through which the fluid flows for observation and the housing in which the tube is mounted.

The indicator of this invention successfully solves the problems of providing a compact yet high capacity indicator that does not interfere with the flow of fluid therethrough and that provides positive and long lasting sealing means for the various parts of the indicator.

The flow indicator of this invention will be described as related to the embodiment shown in the accompanying drawings. Of the drawings:

Figure 1 is a plan view of an indicator embodying the invention.

Figure 2 is a longitudinal sectional elevation of the indicator taken substantially through the center thereof.

Figure 3 is a fragmentary enlarged sectional elevational view of the indicator corresponding to a portion of Figure 2 and showing the left-hand end of the transparent tube and associated parts.

The indicator shown in the accompanying drawings comprises a protective member 10 within which is located a transparent tube 11. The protective member 10 includes a central cylinder 12 and coupling fittings or end portions 13 attached thereto and aligned therewith. The cylinder 12 is provided with diametrically opposed ports 12a through which the tube 11 and its contents may be viewed. The tube 11 is preferably provided with one or more opaque markings 14 aligned with the ports 12a for aiding in observing the flow of fluid.

Each end fitting 13 is provided with screw threads 13a on its inner end for engagement with similar screw threads on the adjacent end of the cylinder 12. The opposite end of each fitting 13 is also provided with screw threads 13b for attaching the indicator into the fluid line.

As can be seen in Figure 2, each end fitting 13 is provided with a central passage 13c of relatively large diameter with these passageways being substantially aligned with each other and with a larger internal passageway 12b in the central cylinder 12. Each fitting passageway 13c is only slightly smaller in diameter than the inside diameter of the transparent tube 11 so that unrestricted flow through the indicator is achieved.

The inner end of each central passageway 13c in a fitting 13 is enlarged as indicated at 13d to provide a chamber defined on its outer end by inwardly extending annular shoulder 13e.

At each end of the transparent tube 11 there is provided a deformable gasket 15 adapted to make sealing engagement with the end edges of the transparent tube 11. Each gasket is held in place against the end edge of the tube by means of an annular washer 16 provided with an annular flange 16a located inwardly of the washer and extending toward the center of the tube. Each washer bears against the side of the gasket on the side opposite to that contacting the tube 11. A helical compression spring 17 is provided between each shoulder portion 13e and the adjacent washer 16 forcing the washer 16 toward the tube 11 to hold the gasket 15 against the tube.

As is shown most clearly in Figure 3, the outer annular edge part 15a is arranged in sealing engagement with the protective member 10. This sealing engagement is provided by clamping each annular part 15a between the central cylinder 12 of the protective member and an end fitting 13. The clamping surfaces 12c and 13g are sloped generally outwardly and away from the adjacent end edge of the transparent tube 11.

Each gasket 15 is a deformable plastic material that is resistant to the fluids adapted to flow through the indicator. These materials are well known to those skilled in the art and a suitable material is a polyethylene plastic.

As is shown in Figure 3, the gaskets 15 not only serve to seal the transparent tube 11 to the protective member 10 but also serve to space the tube properly within the indicator. Thus the parts of the indicator are so proportioned that portions of each gasket are partially extruded to provide this spacing. Thus each gasket includes a first portion 15b extruded into the area between the tube 11 and the protective member 10, a second portion 15c extruded around the inner edge of the tube 11 and a third portion 15d extruded between the washer 16 and the adjacent inner surface of the protective member 10. As can also be seen most clearly in Figure 3, the edges of the tube 11 are chamfered in order to aid the extruding of the first and second portions 15b and 15c and in order to prevent a sharp edge of the tube cutting into each of these portions.

The indicator described and claimed herein is relatively small in cross-sectional area as can be seen from an inspection of the drawing. Furthermore, the parts are firmly sealed against leakage by positive pressure of the gaskets. Furthermore as each spring 17 applies pressure against both gaskets 15, one spring may be omitted if desired and substituted by a rigid backing member without sacrifice of pressure on the gaskets. A more uniform sealing action is provided in this invention as the gaskets bear against the ends of the tube 11 instead of against the sides thereof. These ends can be cut square to very close tolerances while the outside surface of transparent tubes and particularly of glass tubes often vary widely so that when the gaskets bear against these outer surfaces uneven sealing is often achieved.

By attaching the outer annular parts of the gaskets 15 to the protective member 10 the inner ends of the springs 17, the washers 16 and the tube 11 are all floating on the gaskets. This provides a firm yet yielding structure that avoids severe stresses and strains. Furthermore with this structure the tube 11 can be kept very short and does not need to be but only slightly longer than the longitudinal length of the ports 12a. In prior structures the transparent tubes often were required to be relatively long with the resulting magnifications of strains. As the tube is ordinarily the most fragile portion of the indicator this avoidance of undue length and the resulting strains is very important in avoiding breakage.

Having described my invention as related to the embodiments shown in the drawings, it is my intention that the invention be not limited by any of the details of description, unless otherwise specified, but rather be construed broadly within its spirit and scope as set out in the accompanying claims.

I claim:

1. An indicator conduit apparatus, comprising: a transparent tube; a surrounding protective member within which the tube is located and containing ports through which the tube and contents are viewable; a sealing gasket on each end edge of the tube; a washer on the side of each gasket on the side thereof opposite the tube; spring means urging each gasket into sealing contact with its end edge; and means sealing the gaskets to the protective member on opposite sides of the ports, the outside diameter of the tube being less than the inside diameter of the protective member in the section adjacent to the tube and each gasket including a first portion extruded into the area between the tube and protective member, a second portion extruded around the inner edge of the tube, both extruded portions serving to lock the tube firmly yet yieldingly in place and a third portion extruded into the area between the washer and the inside wall of the protective member.

2. An indicator conduit apparatus, comprising: a transparent tube having end surfaces; a surrounding protective member within which the tube is located and containing ports through which the tube and contents are viewable, the tube including said end surfaces being spaced from but closely adjacent to the protective member; a distortable sealing gasket normally in sealing contact against each end surface of the tube and against an adjacent annular surface of the protective member; a washer member bearing against each distortable sealing gasket on the side thereof opposite the tube; and yieldable compression means normally bearing against each of said washer members on the side thereof opposite to said gasket structure, each of said washer members including a relatively confining annular portion including an inwardly directed flanged part for pressing the gasket against said tube end surface under the urging of said yieldable compression member and a relatively open outer portion at the outer edge of the guide and confining member for directing the corresponding outer portion of the gasket into said sealing engagement with said annular portion of the protective member under the urging of said compression member.

3. An indicator conduit apparatus, comprising: a transparent tube; a surrounding protective member within which the tube is located and containing ports through which the tube and contents are viewable; a sealing gasket on each end edge of the tube; a washer on the side of each gasket on the side thereof opposite the tube; spring means urging each gasket into sealing contact with its end edge; and means sealing the gaskets to the protective member on opposite sides of the ports, the outside diameter of the tube being less than the inside diameter of the protective member in the section adjacent to the tube and each gasket including a first portion extruded into the area between the tube and protective member, a second portion extruded around the inner edge of the tube, both extruded portions serving to lock the tube firmly yet yieldingly in place and a third portion extruded into the area between the washer and the inside wall of the protective member, each washer including an annular flange of smaller diameter than the corresponding end of the tube and extending inwardly thereof, said second extruded portion of the gasket being located between this flange and the tube.

4. An indicator conduit apparatus, comprising: a transparent tube; a surrounding protective member within which the tube is located and containing ports through which the tube and contents are viewable; a sealing gasket on each end edge of the tube; resilient means including an annular member bearing on the side of each gasket on the side thereof opposite to the tube, said resilient means urging each gasket into sealing contact with its end edge; and means sealing the gaskets to the protective member on opposite sides of the ports, the outside diameter of the tube being less than the inside diameter of the protective member in the section adjacent to the tube and each gasket including a first portion extruded into the area between the tube and protective member, a second portion extruded around the inner edge of the tube, both extruded portions serving to lock the tube firmly yet yieldingly in place and a third portion extruded into the area between the annular member and the inside wall of the protective member.

5. An indicator conduit apparatus, comprising: a transparent tube; a surrounding protective member within which the tube is located and containing ports through which the tube and contents are viewable; a sealing gasket on each end edge of the tube; resilient means including an annular member bearing on the side of each gasket on the side thereof opposite to the tube, said resilient means urging each gasket into sealing contact with its end edge; and means sealing the gaskets to the protective member on opposite sides of the ports, the outside diameter of the tube being less than the inside diameter of the protective member in the section adjacent to the tube and each gasket including a first portion extruded into the area between the tube and protective member, and a second portion extruded around the inner edge of the tube, both extruded portions serving to lock the tube firmly yet yieldingly in place.

References Cited in the file of this patent

UNITED STATES PATENTS

| Number | Name | Date |
| --- | --- | --- |
| 49,366 | Belfield | Aug. 15, 1865 |
| 828,108 | Graham | Aug. 7, 1905 |
| 992,612 | Stanton | May 16, 1911 |
| 1,666,918 | Scoville | Apr. 24, 1928 |
| 1,893,233 | Hull | Jan. 3, 1933 |
| 2,570,322 | Christopher | Oct. 9, 1951 |
| 2,624,308 | Wittlin | Jan. 6, 1953 |